US007534128B2

(12) United States Patent
Caveney et al.

(10) Patent No.: US 7,534,128 B2
(45) Date of Patent: May 19, 2009

(54) PUSH-PULL PLUGS AND TOOLS

(75) Inventors: Jack E. Caveney, Hinsdale, IL (US); Scott R. Hartman, Oak Forest, IL (US); David R. Davis, Richton Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/927,025

(22) Filed: Oct. 29, 2007

(65) Prior Publication Data

US 2008/0057770 A1 Mar. 6, 2008

Related U.S. Application Data

(63) Continuation of application No. 11/255,301, filed on Oct. 21, 2005, now Pat. No. 7,297,013.

(60) Provisional application No. 60/621,229, filed on Oct. 22, 2004.

(51) Int. Cl.
*B23P 19/00* (2006.01)

(52) U.S. Cl. ........................................ 439/480; 29/764

(58) Field of Classification Search ................. 439/352, 439/483, 480; 29/764, 758, 739, 278; 81/3.8; 385/135

See application file for complete search history.

(56) References Cited

U.S. PATENT DOCUMENTS

| | | | | |
|---|---|---|---|---|
| 3,443,297 | A | 5/1969 | Lusby, Jr. | |
| 3,953,098 | A | 4/1976 | Avery et al. | |
| 4,155,159 | A | 5/1979 | Hogan et al. | |
| 4,194,805 | A * | 3/1980 | Ayer et al. | 439/465 |
| 4,268,115 | A | 5/1981 | Slemon et al. | |
| 4,541,311 | A * | 9/1985 | Trammell, Jr. | 81/3.8 |
| 4,747,656 | A | 5/1988 | Miyahara et al. | |
| 4,762,389 | A | 8/1988 | Kaihara | |
| 4,872,736 | A | 10/1989 | Myers et al. | |
| 5,011,424 | A | 4/1991 | Simmons | |
| 5,159,652 | A | 10/1992 | D'Alphonse et al. | |
| 5,171,161 | A | 12/1992 | Kachlic | |
| 5,233,674 | A | 8/1993 | Vladic | |
| 5,254,013 | A | 10/1993 | Tanaka | |
| 5,330,366 | A | 7/1994 | Tsuji et al. | |
| 5,435,744 | A | 7/1995 | Derstine et al. | |
| 5,507,666 | A | 4/1996 | Yamanashi | |
| 5,580,268 | A | 12/1996 | Miyazawa | |

(Continued)

FOREIGN PATENT DOCUMENTS

DE 8911541 11/1989

(Continued)

*Primary Examiner*—Neil Abrams
(74) *Attorney, Agent, or Firm*—Robert A. McCann; Zachary J. Smolinski

(57) ABSTRACT

A tool and method for using the tool for a push-pull plug with an outer housing that may be moved forwardly and backwardly along a plug housing in order to affect the operation of a latch arm. The tool has a handle, stem, and a clip on the stem on the opposite end as the handle. The clip has a pair of opposing clip arms perpendicular to the stem. The clip arms have clip ridges that face each other. The stem and clip can be made of a flexible material.

8 Claims, 12 Drawing Sheets

U.S. PATENT DOCUMENTS

| | | | | |
|---|---|---|---|---|
| 5,634,809 | A | 6/1997 | Hirai | |
| 5,666,865 | A * | 9/1997 | Ito | 81/3.8 |
| 5,710,851 | A | 1/1998 | Walter et al. | |
| 5,737,463 | A | 4/1998 | Weiss et al. | |
| 6,019,521 | A | 2/2000 | Manning et al. | |
| 6,070,924 | A * | 6/2000 | Sweetman | 294/24 |
| 6,083,052 | A | 7/2000 | Adams et al. | |
| 6,095,695 | A | 8/2000 | Ohtsuka et al. | |
| 6,116,939 | A | 9/2000 | Fukuda | |
| 6,174,190 | B1 | 1/2001 | Tharp et al. | |
| 6,249,960 | B1 | 6/2001 | Faesel | |
| 6,250,942 | B1 | 6/2001 | Lemke et al. | |
| 6,328,601 | B1 | 12/2001 | Yip et al. | |
| 6,358,091 | B1 | 3/2002 | Lo et al. | |
| 6,368,143 | B1 | 4/2002 | Adams | |
| 6,371,794 | B1 | 4/2002 | Bauer et al. | |
| 6,398,576 | B1 | 6/2002 | Hwang et al. | |
| 6,488,543 | B2 * | 12/2002 | Oliphant et al. | 439/676 |
| 6,572,275 | B2 | 6/2003 | Shimoji et al. | |
| 6,572,394 | B1 | 6/2003 | Yamaoka et al. | |
| 6,733,323 | B2 * | 5/2004 | Tso-Chin | 439/484 |
| 6,783,280 | B2 | 8/2004 | Viklund | |
| 6,863,556 | B2 | 3/2005 | Viklund et al. | |
| 7,020,376 | B1 * | 3/2006 | Dang et al. | 385/135 |
| 2003/0022548 | A1 | 1/2003 | Lutsch et al. | |
| 2003/0220000 | A1 | 11/2003 | Ward et al. | |

FOREIGN PATENT DOCUMENTS

| | | |
|---|---|---|
| WO | 9844600 | 10/1998 |

* cited by examiner

PUSH-PULL PLUGS AND TOOLS

CROSS REFERENCE TO RELATED APPLICATION

This application is a continuation of U.S. application Ser. No. 11/255,301 filed Oct. 21, 2005, now U.S. Pat. No. 7,297,013, which claims the benefit of U.S. Provisional Application No. 60/621,229 filed Oct. 22, 2004, and is incorporated herein by reference in its entirety.

FIELD OF THE INVENTION

The present invention relates generally to communications connectors and more particularly to push-pull plugs.

BACKGROUND OF THE INVENTION

With the rising importance of data communications, there is a drive toward the use of high-density connections. Increased density of connections in communications equipment—such as patch panels and network switches—is desirable because increased connection density allows for more connections in a given area. For example, many enterprises employ racks for their networking equipment, and the racks take up a certain amount of floor space. Such enterprises can install more network connections by replacing standard network equipment with high-density network equipment within the same racks. The high-density equipment thus allows the same amount of floor space to support more network connections.

But as connection density is increased, it becomes more difficult to plug in and unplug connectors. Areas with a high density of connections, such as high-density patch panels, leave little space for installers to access the plugs. Because the plugs are very close to one another, it is difficult for a technician to reach between adjacent plugs in order to operate a latch on a plug and thereby release the plug. It is also difficult to hold a plug during insertion. The high density of cables coming out of the plugs adds to these difficulties. It is desirable to have a plug that is easy to insert and remove from a jack, even in high-density environments.

SUMMARY OF THE INVENTION

According to one embodiment of the present invention, a push-pull plug is provided with an outer housing that activates a latch.

According to some embodiments of the present invention, an outer housing has one or more cams that interact with one or more cam followers on a latch arm to move the latch arm between a mated position and an unmated position. In the mated position, a latch provided on the latch arm is in position to latch with a jack. In the unmated position, the latch is in position to be removed from the jack.

A latch arm may be connected to the plug housing only at a rear end of the latch arm. Alternatively, a latch arm is connected to the plug housing at front and rear ends of the latch arm. In another alternative embodiment, the latch arm is connected to the plug housing only at the front of the latch arm.

Springs may be provided to bias the outer housing. In some embodiments, the outer housing is biased in a forward position by the springs, with the latch being in a mated position when the outer housing is in the forward position. In another alternative embodiment, a slider latch is used to secure the plug housing to the outer housing.

DETAILED DESCRIPTION OF THE ILLUSTRATED EMBODIMENTS

Figure 1:
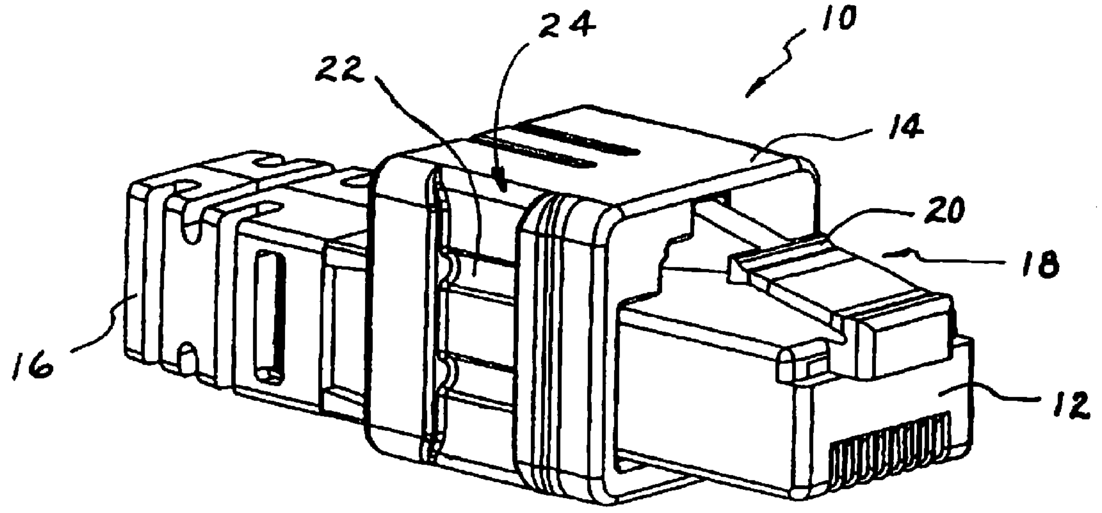
FIG. 1 is a front right perspective view of a plug according to one embodiment of the present invention.

Turning now to FIG. 1, one embodiment of a plug 10 is shown. The plug 10 comprises a plug housing 12 and an outer housing 14. A boot 16 is attached to the rear of the plug housing 12 to control the bend radius of a cable 70 (shown in FIG. 27) terminated at the plug. The outer housing 14 interacts with a latch arm 18, shown in FIG. 3, moving a latch 20 of the latch arm between a first, or mated, position in which the latch is positioned to mate with a jack and a second, or unmated, position in which the latch is positioned to be released from a jack. The interaction between the outer housing 14 and the latch arm 18 allows the plug 10 to be installed and removed by pushing and pulling the outer housing 14. The boot 16 is connected to the plug at a boot adapter 26.

The outer housing 14 has retention notches 22 in retention grooves 24. The retention notches 22 and the retention grooves 24 allow a tool 52, shown in FIG. 10, to securely but releasably grip the outer housing 14 to facilitate insertion of the plug 10 into a jack and removal of the plug from the jack.

Figure 2:
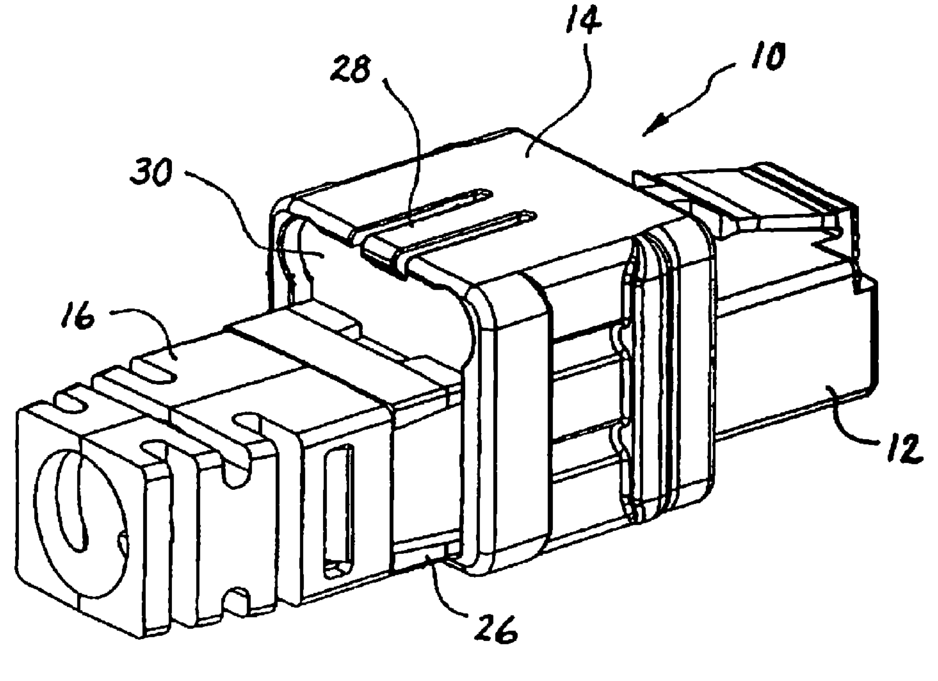
FIG. 2 is a back right perspective view of the plug of FIG. 1.

A rear perspective view of the plug 10 is shown in FIG. 2. The boot 16 is connected to the plug housing 12 at a boot adapter 26. An outer housing latch 28 engages the rear plug wall 30, holding the outer housing 14 in place as the outer housing is forwardly biased (toward the upper right in FIG. 2).

Figure 3:
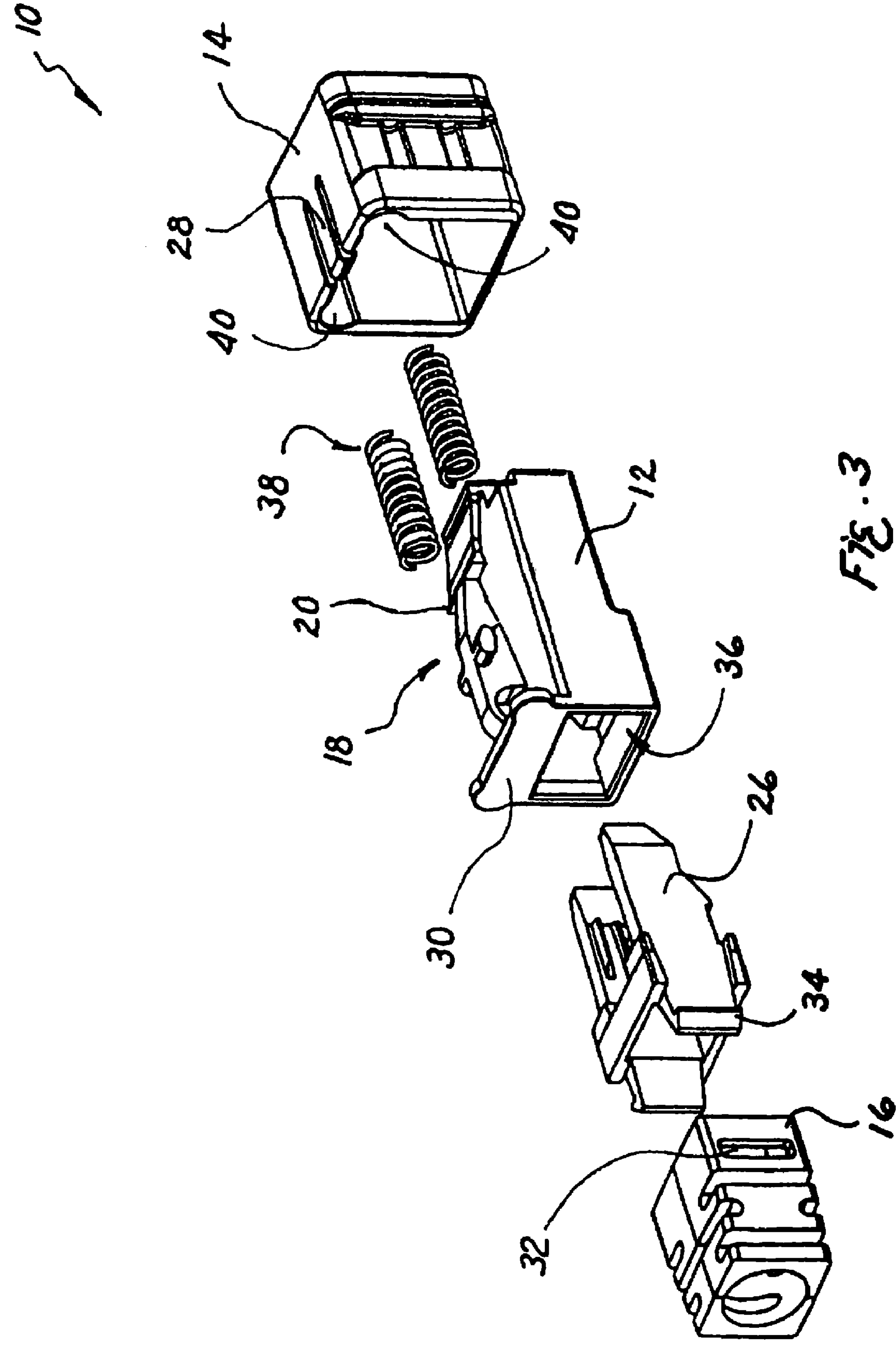
FIG. 3 is a back right exploded view of the plug of FIG. 1.

Turning now to FIG. 3, an exploded view of the plug 10 is shown. To assemble the plug 10, the boot 16 is connected via slots 32 to boot latches 34 on the boot adapter 26. The boot adapter 26 is inserted into a rear opening 36 of the plug housing 12 and may be held in place by latches.

The outer housing 14 is slid onto the plug housing 12 from the front, and springs 38 are inserted into pockets 40 in the outer housing 14. The springs 38 are interposed between the rear plug wall 30 and a front wall of the outer housing 14, and the outer housing latch 28 latches with the rear plug wall 30. The springs 38 bias the outer housing 14 forwardly (toward the upper right in FIG. 3), and the outer housing latch 28 holds the outer housing 14 in place against the biasing force. This arrangement allows the outer housing 14 to be slid backwardly (toward the lower left in FIG. 3), thereby moving the latch arm 18 and the latch 20 from a mated position, as shown in FIG. 4, to an unmated position, as shown in FIG. 5.

Figure 4:
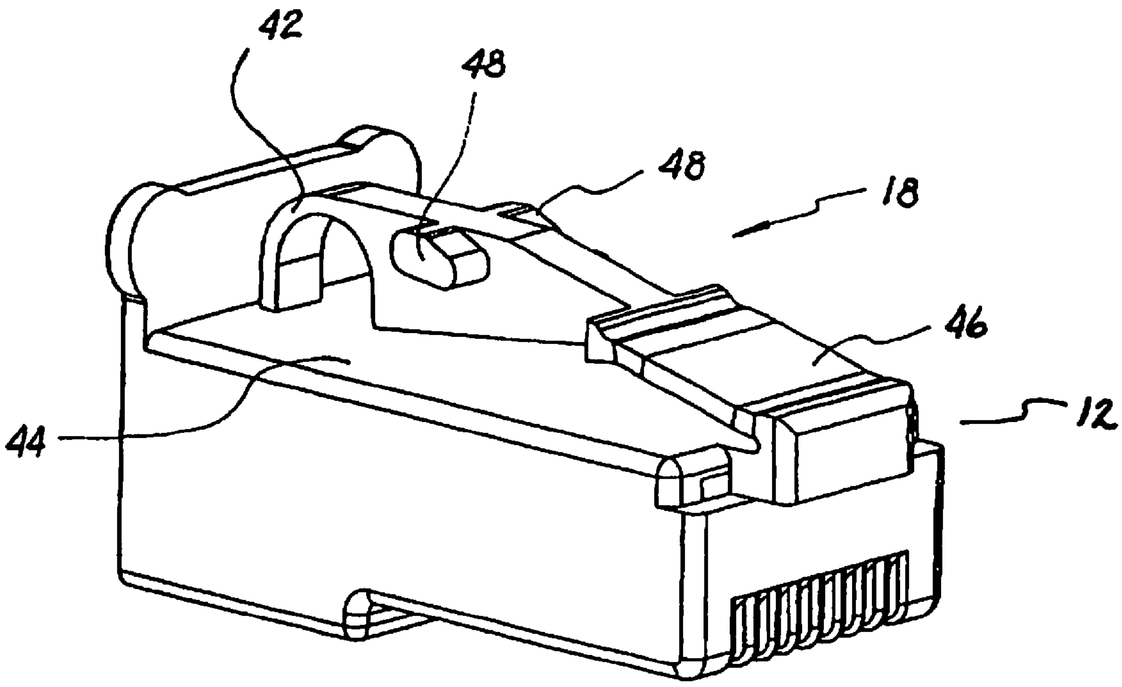
FIG. 4 is a front right perspective view of a plug housing with a latch in a mated position.
Figure 5:
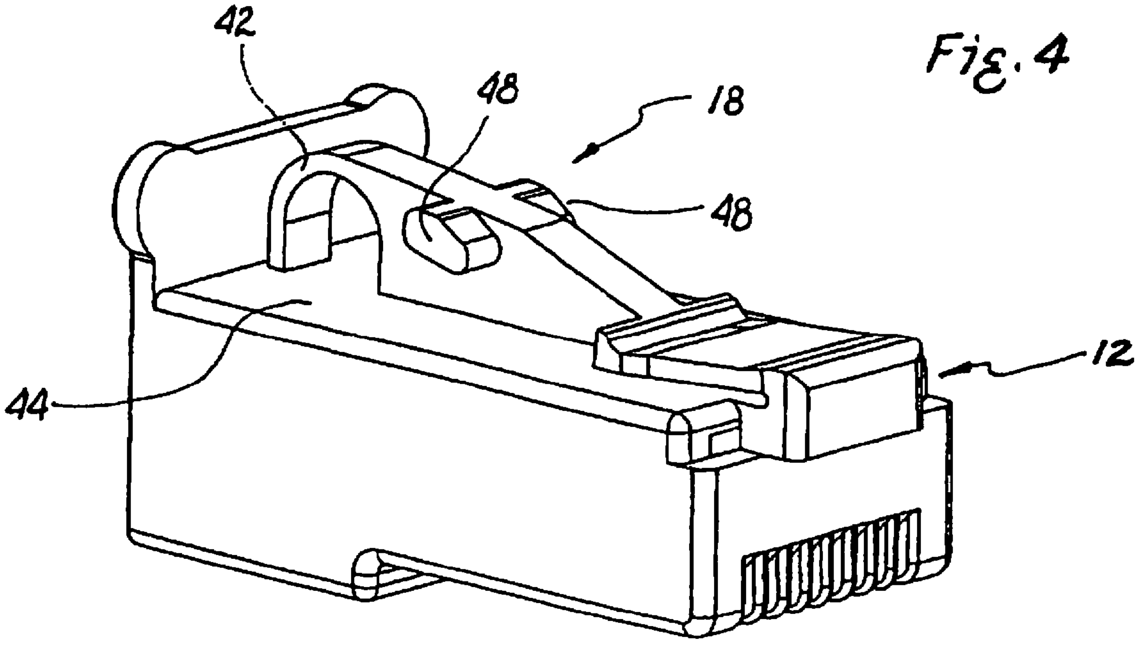
FIG. 5 is a front right perspective view of the plug housing of FIG. 4 with the latch in an unmated position.

In the embodiment shown in FIG. 4, the latch arm 18 is integral with the plug housing 12 and is hingedly attached by a flexible member 42 to an upper surface 44 of the plug housing 12. The latch arm 18 of the embodiment shown in FIG. 4 is also connected to a front edge of the plug housing 12 via a front latch arm support 46. In an alternative embodiment, the front arm latch support 46 may be eliminated.

Figure 6:
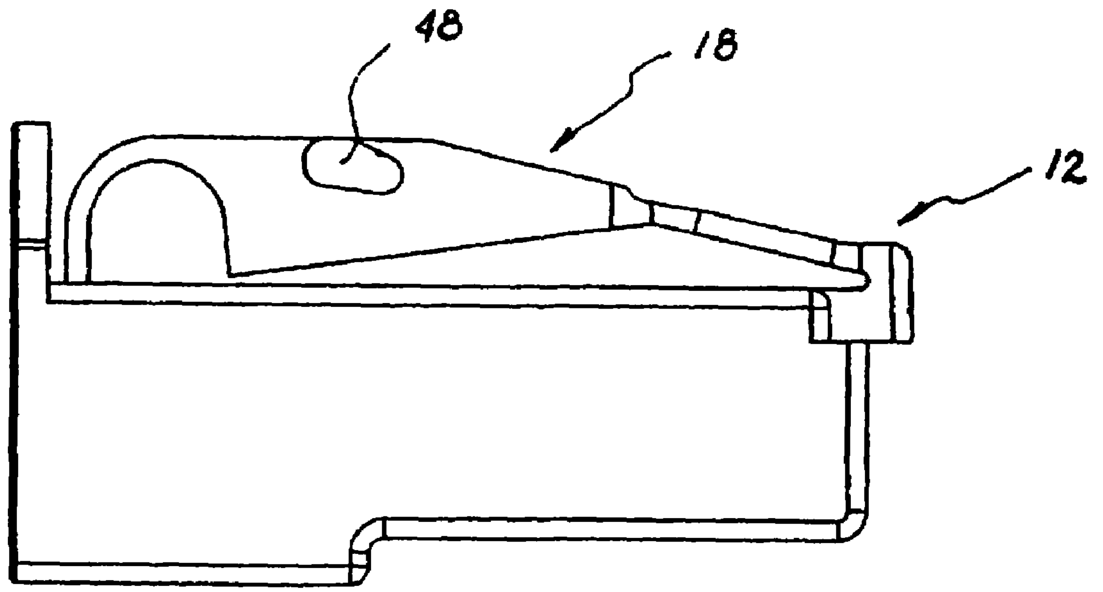
FIG. 6 is a side view of the plug housing of FIG. 4 with the latch in the mated position.
Figure 7:
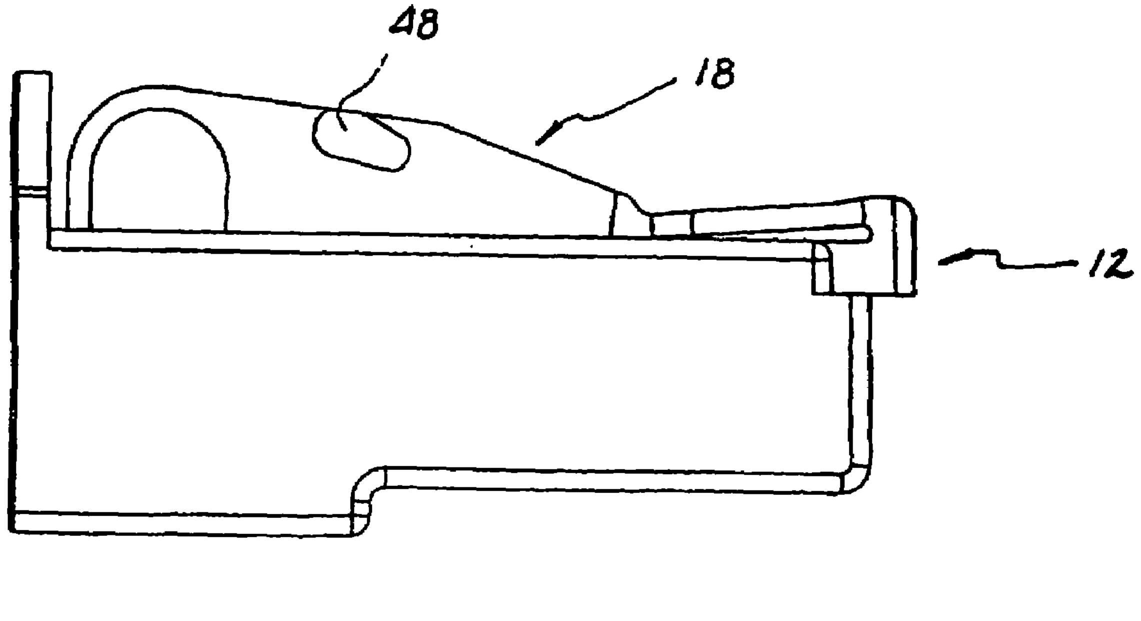
FIG. 7 is a side view of the plug housing of FIG. 4 with the latch in the unmated position.

The latch arm 18 is resiliently biased away from the upper surface 44 of the plug housing 12. Cam followers 48 extend laterally from the latch arm 18. FIG. 4 shows the plug housing 12 having the latch arm 18 in a mated position, which results when the outer housing (not shown in FIG. 4) is in a forward position. FIG. 5 shows the plug housing 12 having the latch arm 18 in an unmated position, which results when the outer housing is in a rearward position. Similarly, FIGS. 6 and 7 are side views of the plug housing 12 showing the latch arm 18, respectively, in a mated position and an unmated position. According to one embodiment of the present invention, the plug housing 12, the latch arm 18, and the flexible member 42 are integrally molded from thermoplastic.

Figure 8:
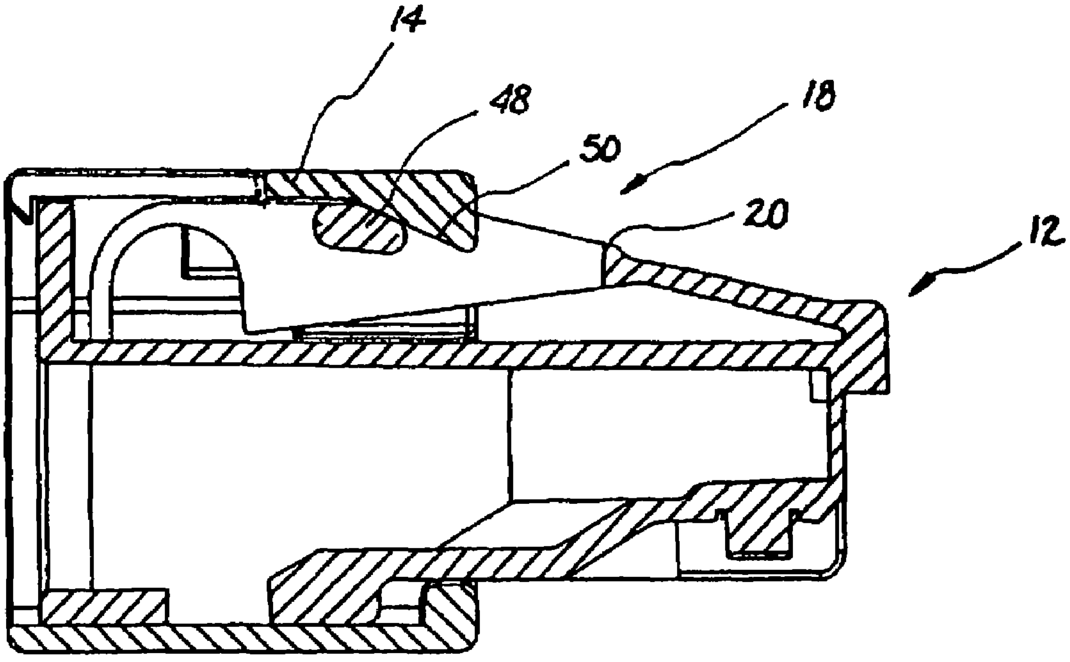
FIG. 8 is a cross-sectional view of a plug housing and an outer housing with the outer housing in a forward position and a latch in the mated position.
Figure 9:
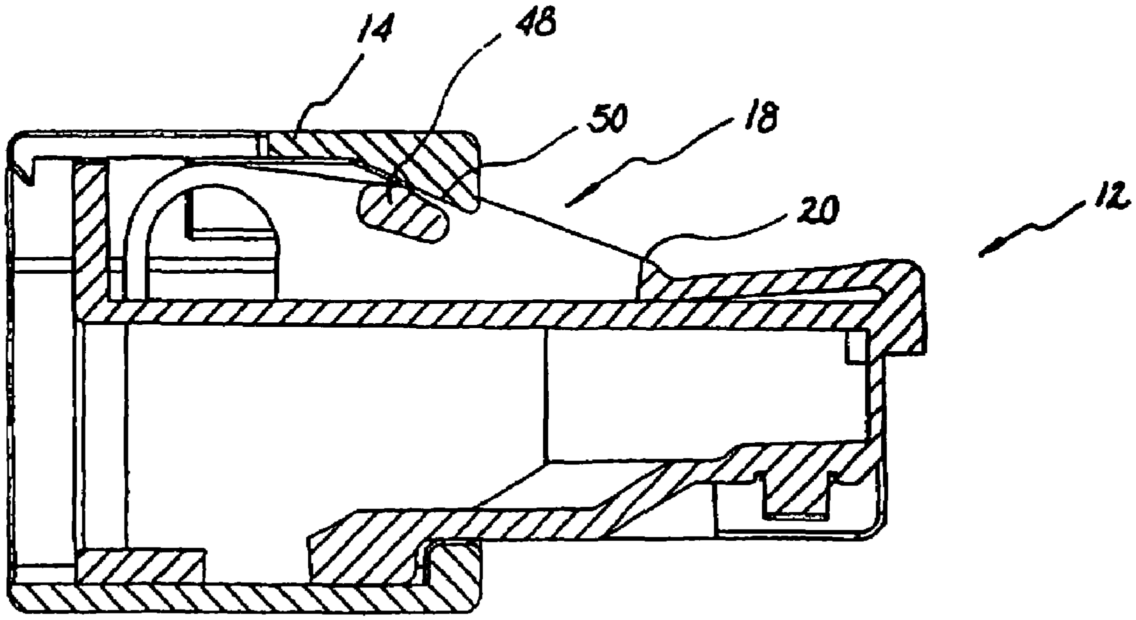
FIG. 9 is a cross-sectional view of the plug housing and the outer housing of FIG. 8 with the outer housing in the rearward position and the latch in the unmated position.

FIGS. 8 and 9 are cutaway views of the plug housing 12 and the outer housing 14, showing the interaction between cam surfaces 50 on the outer housing 14 and cam followers 48 on the latch arm 18. The cutaway views in FIGS. 8 and 9 show the interaction of only one cam surface 50 and one cam follower 48, but in the embodiment shown in FIGS. 1-9 there are two cam surfaces 50 on the outer housing 14 and two cam followers 48 on the latch arm 18.

In FIG. 8, the outer housing 14 is in the forward position, and the latch arm 18 is in the mated position. When the latch arm 18 is in the mated position, the cam follower 48 is in its uppermost position and the latch 20 is positioned to latch onto mating projections within a jack. During insertion of the plug into the jack, when the latch arm is in the mated position the latch arm is deflected downwardly and then springs back up due to the resilience of the latch arm 18, with the latch 20 locking behind the mating projections of the jack.

To release the plug from the jack, a user pulls the outer housing 14 back to a rearward position as shown in FIG. 9. This forces the cam surface 50 of the outer housing backwardly, thereby forcing the cam follower 48 downwardly. The latch arm 18 moves downwardly with the cam follower 48 until it reaches the unmated position shown in FIG. 9, with the latch 20 disengaged from a mating projection in the jack. With the latch arm 18 in its unmated position, the plug is free to be removed from the jack. After removal of the plug from the jack, the springs 38 (shown in FIG. 3) force the outer housing 14 forwardly, and the latch arm 18 returns to the mated position shown in FIG. 8.

Removal of the plug 10 from a jack requires that a user pull the outer housing 14 backwardly, and does not require direct downward force on a latch from the user. This simplifies manual removal of the plug from a jack. Plugs according to the present invention may also be used with a tool as shown in FIGS. 10-12.

Figure 10:
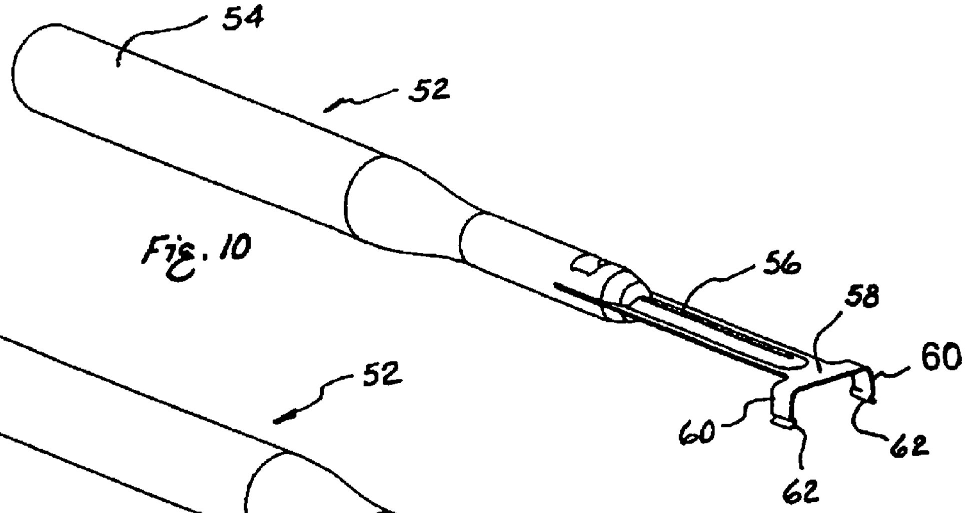
FIG. 10 is a perspective view of a plug installation and removal tool.

Turning now to FIG. 10, a tool 52 for insertion and removal of plugs according to some embodiments of the present invention is shown. The tool 52 may be used with the plug embodiment shown in FIGS. 1-9 and FIGS. 20-28, but is illustrated in FIGS. 10-12 in use with the plug embodiment shown in FIGS. 13-19. The tool 52 has a handle 54 and a stem 56 extending from the handle 54. The stem 56 has a clip 58 at its end. The clip 58 comprises opposing clip arms 60 having inwardly-directed clip ridges 62. According to one embodiment of the tool 52, the handle 54 is plastic and the stem 56 and clip 58 are metal. Other materials may be employed. It is preferred for the stem 56 and the clip 58 to have flexibility in order to facilitate insertion and removal of plugs using the tool, as shown in more detail in FIGS. 11 and 12.

Figure 11:
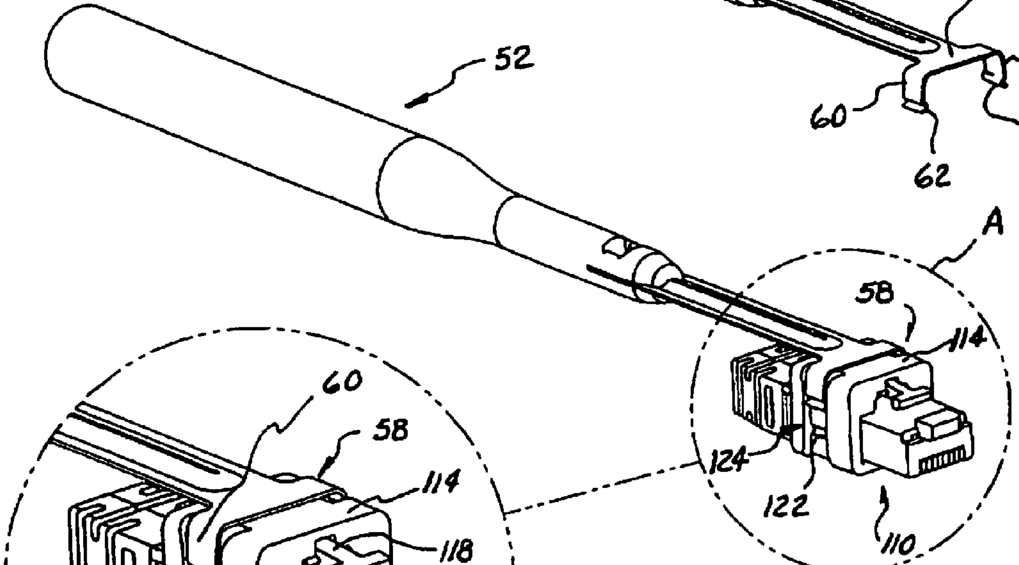
FIG. 11 is a perspective view of the tool of FIG. 10 gripping a plug.
Figure 12:
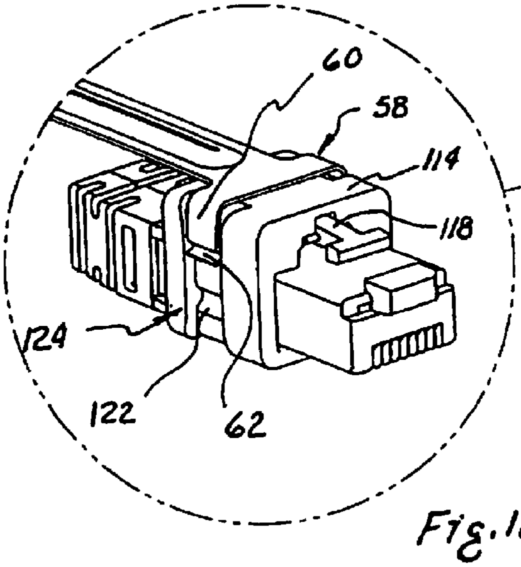
FIG. 12 is a detail view of the detail section "A" of FIG. 11.
Figure 15:
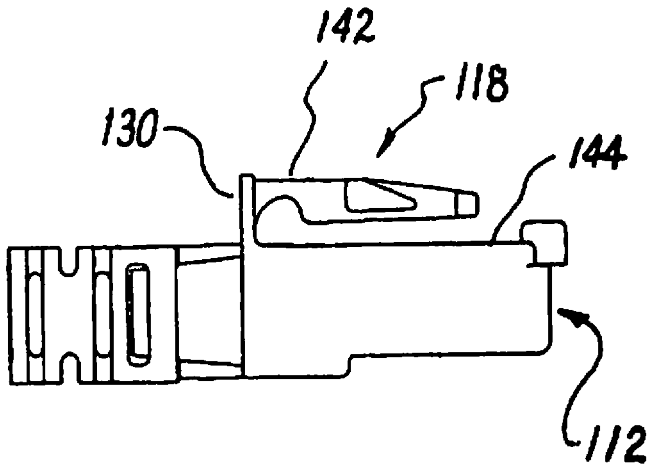
FIG. 15 is a side view of the plug housing of FIG. 13.
Figure 13:
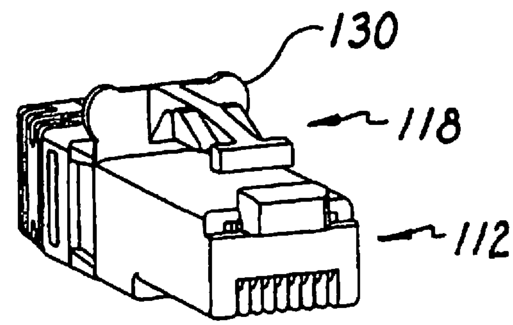
FIG. 13 is a front right perspective view of a plug housing according to one embodiment of the present invention.
Figure 14:
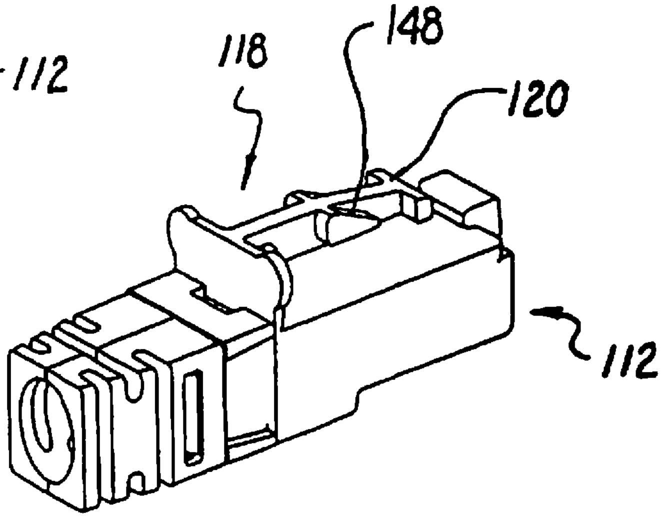
FIG. 14 is a rear right perspective view of the plug housing of FIG. 13.

FIG. 11 shows the tool 52 gripping a plug 110. As shown in more detail in FIG. 12, the clip ridges 62 of the clip engage the retention notches 122 on the outer housing 114. In operation, it is preferred to first engage one of the retention notches 122 with one clip ridge 62, then axially rotate the tool 52 to engage the opposing retention notch 122 with the other clip ridge 62. When the clip ridges 62 are inserted into the retention notches 122, the tool may be pulled backwardly (toward the upper left in FIGS. 10-12), moving the outer housing 114 to its rearward position and thereby moving the latch arm 118 to its unmated position. With the latch arm 118 in the unmated position, the plug 110 will be removed from a jack as the tool 52 is pulled.

The tool 52 may also be used for insertion of a plug into a jack. To insert a plug into a jack, the clip ridges 62 are inserted into opposing retention notches 122 of an uninserted plug. The tool is then guided toward a jack and the plug is inserted into the jack. Next, the tool may be disengaged from the plug by axially rotating the tool to disengage one clip ridge 62 from its retention notch 122. Following this disengagement, a slight upward movement of the tool and a slight axial rotation in the opposite direction disengages the tool and allows the tool to be pulled backwardly, with the plug remaining in the jack. According to one embodiment, four retention notches 122 are provided in the outer housing 114. With two retention notches 122 on each side of the outer housing 114, the retention notches 122 may be engaged by the tool 52 from above or from below. In an alternative embodiment, only one retention notch is provided on each side of the outer housing, allowing engagement from above or below by a tool having elongated clip arms.

FIGS. 13-19 show features of a plug 110 according to an alternative embodiment of the present invention. In the alternative embodiment, the latch arm 118 of the plug 110 is integral with the plug housing 112 and extends in a forward direction from the rear plug wall 130. The latch arm 118 is hingedly attached by a flexible member 142 to the rear plug wall 130. The latch arm 118 is resiliently biased away from the upper surface 144 of the plug housing 112. The latch arm 118 has cam followers 148 and a latch 120 and operates similarly to the latch arm 18 of the embodiment shown in FIGS. 1-9. The latch arm 118 of FIGS. 13-19 is free from connection to the upper surface 144 of the plug housing 112 along its forward edge.

Figure 16:
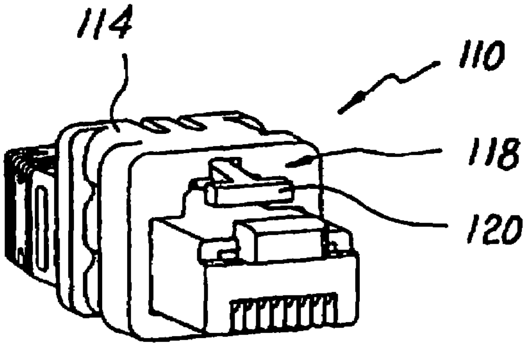
FIG. 16 is a front right perspective view of a plug having an outer housing, with a latch in a mated position.
Figure 17:
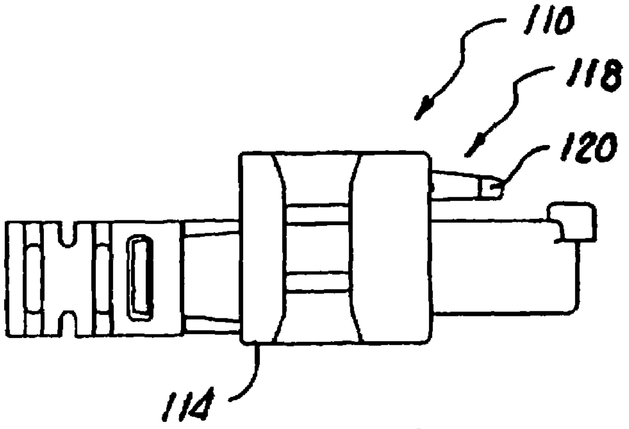
FIG. 17 is a side view of the plug of FIG. 16.
Figure 18:
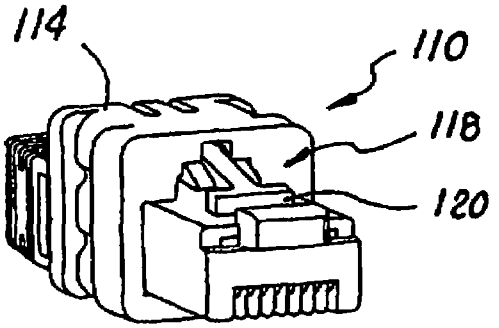
FIG. 18 is a front right perspective view of the plug of FIG. 16, with the latch in an unmated position.
Figure 19:
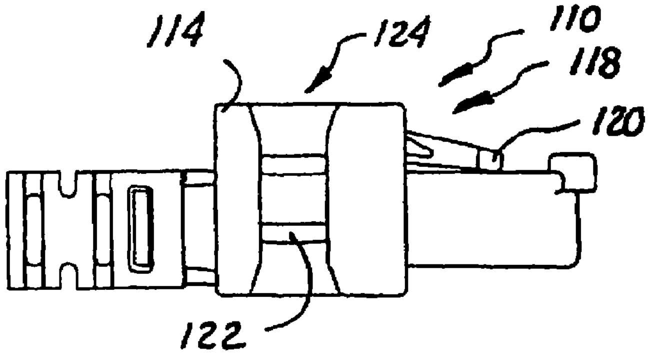
FIG. 19 is a side view of the plug of FIG. 18.
Figure 20:
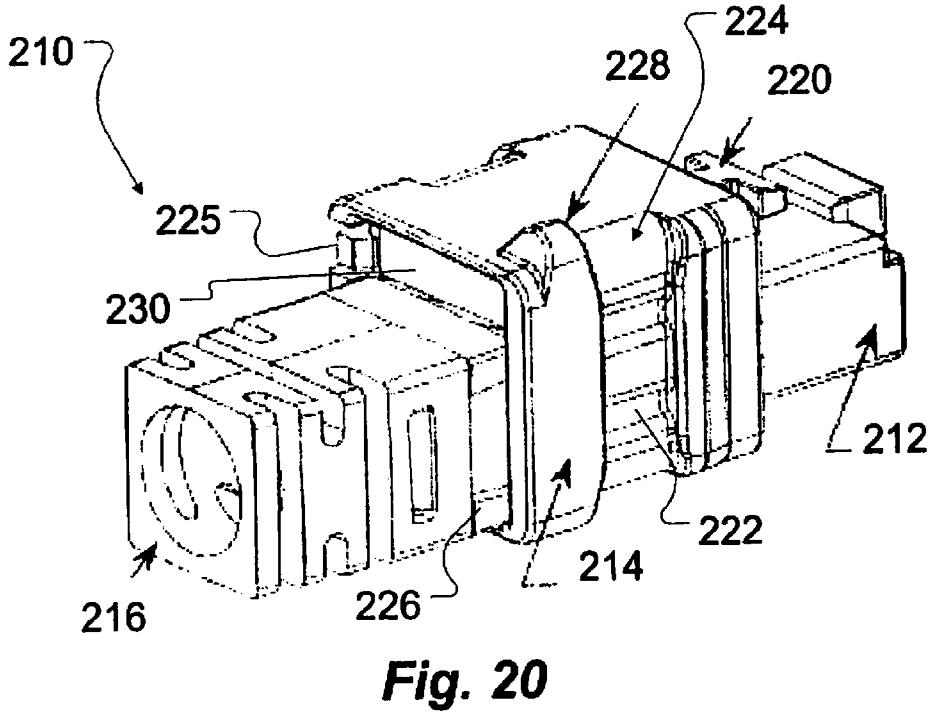
FIG. 20 is a back right perspective view of a plug according to another embodiment of the present invention.
Figure 21:
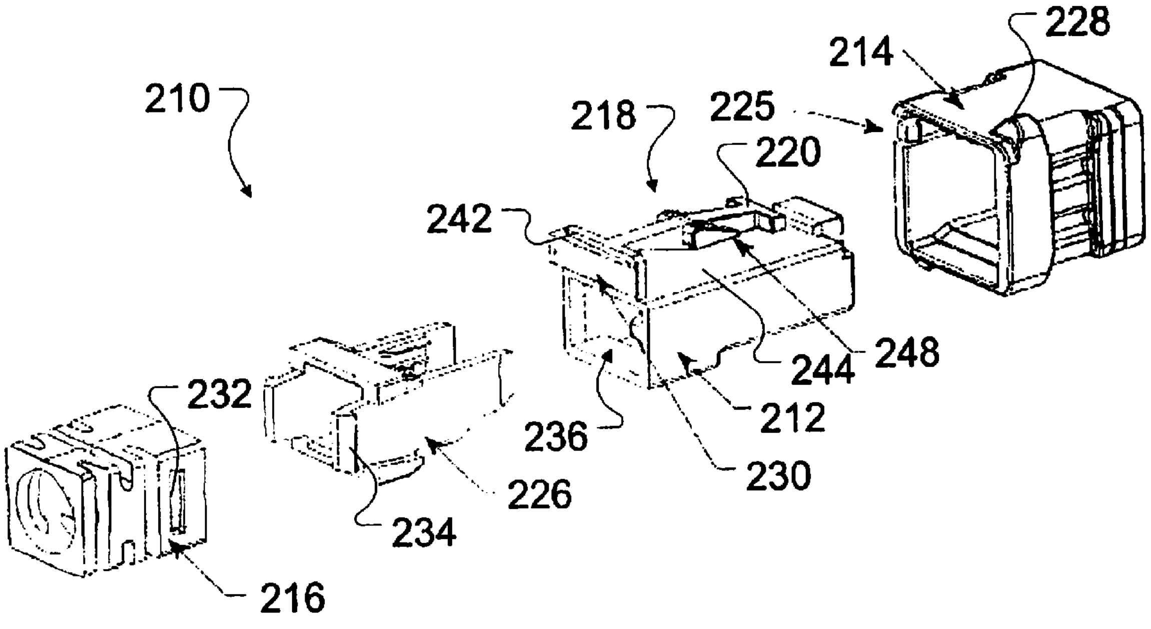
FIG. 21 is a back right exploded view of the plug of FIG. 20.

FIGS. 16-19 show the plug 110 with an outer housing 114. In FIGS. 16 and 17, the outer housing 114 is in its forward position, and the latch arm 118 and latch 120 are in their mated position. In FIGS. 18 and 19, the outer housing 114 has been moved to its rearward position, and the latch arm 118 and the latch 120 are in their unmated position. Similarly to the embodiment of FIGS. 1-9, springs are provided within pockets of the outer housing 114 to return the outer housing 114 to its forward position when the outer housing 114 is released. As shown in FIG. 19, the outer housing 114 has retention notches 122 in a retention groove 124, enabling the use of a tool to install and remove the plug 110.

FIGS. 20-27 show plug 210 in yet another alternative embodiment of the present invention. In this embodiment, the outer housing 214 includes a finger grip 228 which allows a user to insert and remove the plug 210 without the use of a tool.

Figure 24:
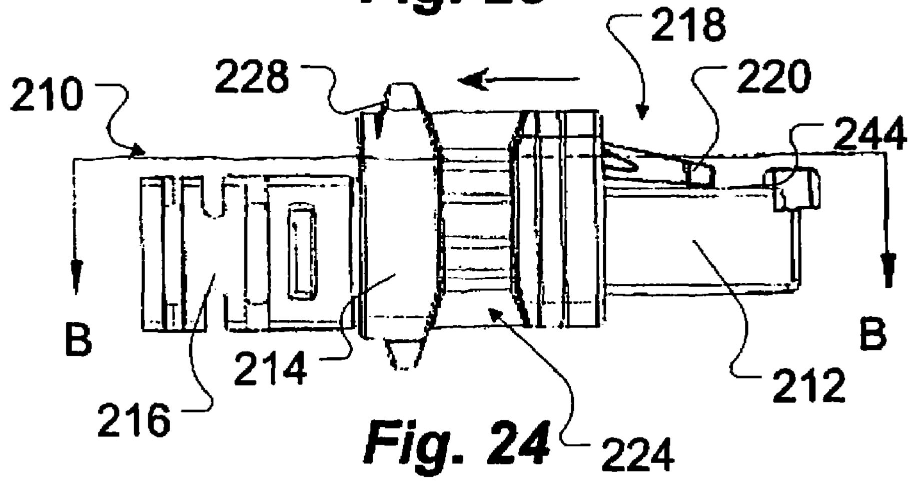
FIG. 24 is a side view of the plug of FIG. 20 with the latch in the unmated position.

The outer housing 214 is slid onto the plug housing 212 from the front, either manually by finger grip 228, or by the use of a tool, and is held in place by one or more slider latches 225. This arrangement allows the outer housing 214 to be slid backwardly (toward the lower left in FIG. 21), thereby moving the latch arm 218 and the latch 220 from a mated position, as shown in FIG. 22, to an unmated position, as shown in FIG. 24.

In the embodiment shown in FIGS. 22-25, the latch arm 218 of the plug 210 is integral with the plug housing 212 and extends in a forward direction from the integral spring arm 230. The latch arm 218 is hingedly attached by a member 242 to an integral spring arm 230. The latch arm 218 is resiliently biased away from the upper surface 244 of the plug housing 212. The latch arm 218 has cam followers 248 that extend laterally from the latch arm 218 and a latch 220. The latch arm 218 is free from connection to the upper surface 244 of the plug housing 122 along its forward edge.

Figure 22:
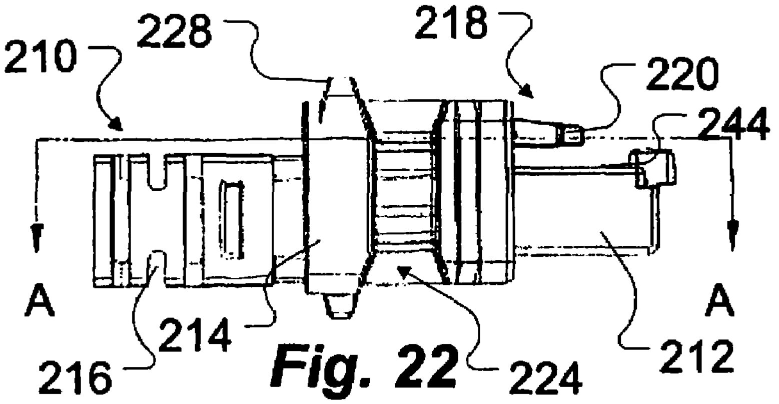
FIG. 22 is a side view of the plug of FIG. 20 with the latch in the mated position.
Figure 23:
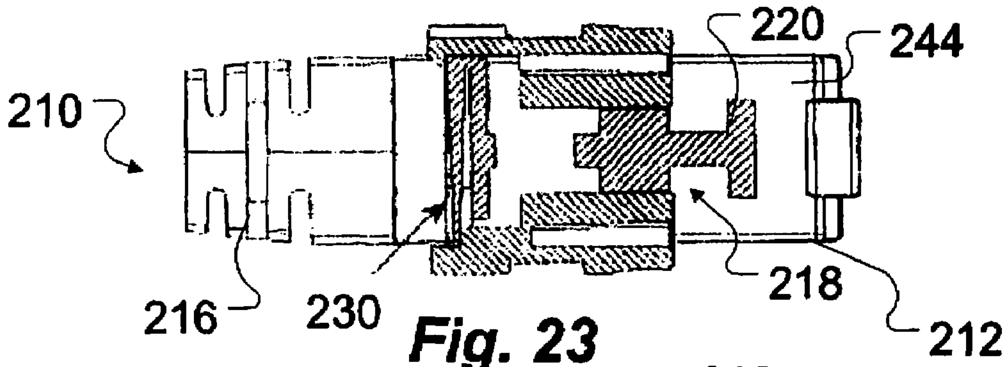
FIG. 23 is a sectional view of the plug of FIG. 22 taken along line A-A of FIG. 22.
Figure 25:
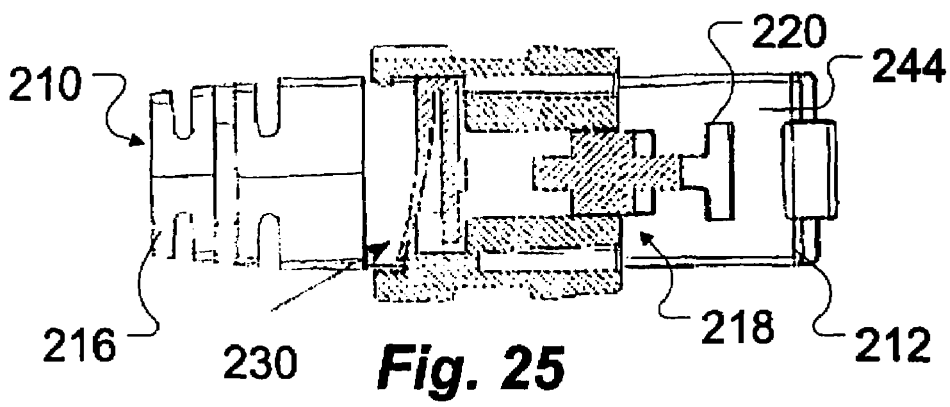
FIG. 25 is a sectional view of the plug of FIG. 24 taken along line B-B of FIG. 24.

FIG. 22 shows the plug housing 212 having the latch arm 218 in a mated position, which results when the outer housing 214 is in a forward position. FIG. 24 shows the plug housing 212 having the latch arm 218 in an unmated position, which results when the outer housing is in a rearward position. Similarly, FIGS. 23 and 25 are sectional views of the plug housing 212 showing the latch arm 218, respectively, in a mated position and an unmated position. According to one embodiment of the present invention, the plug housing 212 and the latch arm 218 are integrally molded from thermoplastic.

As shown in FIG. 22, when the outer housing 214 is in the forward position, the latch arm 218 is in the mated position. When the latch arm 218 is in the mated position, the cam follower 248 is in its uppermost position and the latch 220 is positioned to latch onto mating projections within a jack. Insertion of the plug 210 into the jack is essentially the same as the insertion of plug 10, described above.

To release the plug from the jack, a user pulls the outer housing 214 back to rearward position using finger grip 228. This forces a cam surface 50 (described above) of the outer housing backwardly, thereby forcing the cam follower 248 downwardly. The latch arm 218 moves downwardly with the cam follower 248 until it reaches the unmated position shown in FIG. 24, with the latch 220 disengaged from a mating projection in the jack. With the latch arm 218 in its unmated position, the plug is free to be removed from the jack. After removal of the plug from the jack, the integral spring arm 230 forces the outer housing 214 forwardly, and the latch arm 218 returns to the mated position.

Figure 26:
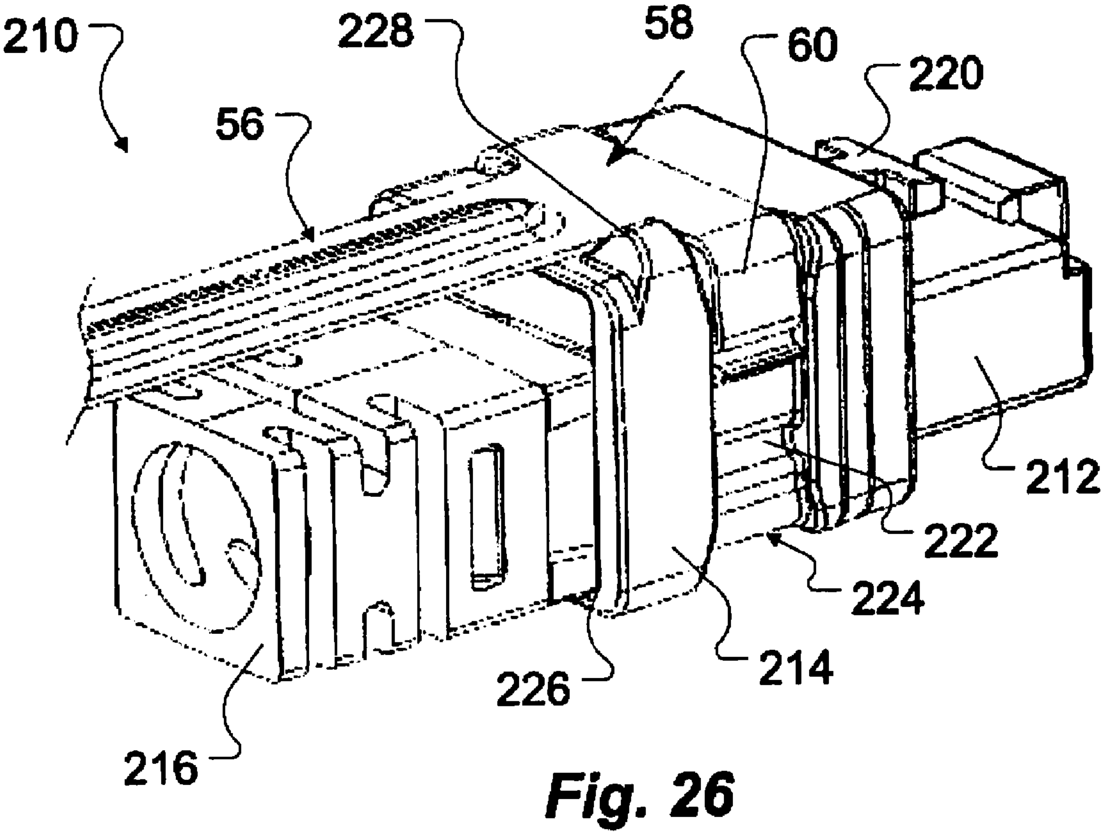
FIG. 26 is a perspective view of the tool of FIG. 10 gripping the plug of FIG. 20.

Removal of the plug 210 from a jack requires that a user pull the outer housing 214 backwardly using finger grip 228, and does not require direct downward force on a latch from the user. This simplifies manual removal of the plug from a jack. Plugs according to this embodiment may also be used with a tool 52 as shown in FIG. 26, which shows the tool 52 gripping a plug 210. The clip ridges 62 of the clip engage the retention notches 222 on the outer housing 214. The tool 52 may also be used for insertion of a plug 210 into a jack by the same method as described above with respect to plug 110.

Figure 27:
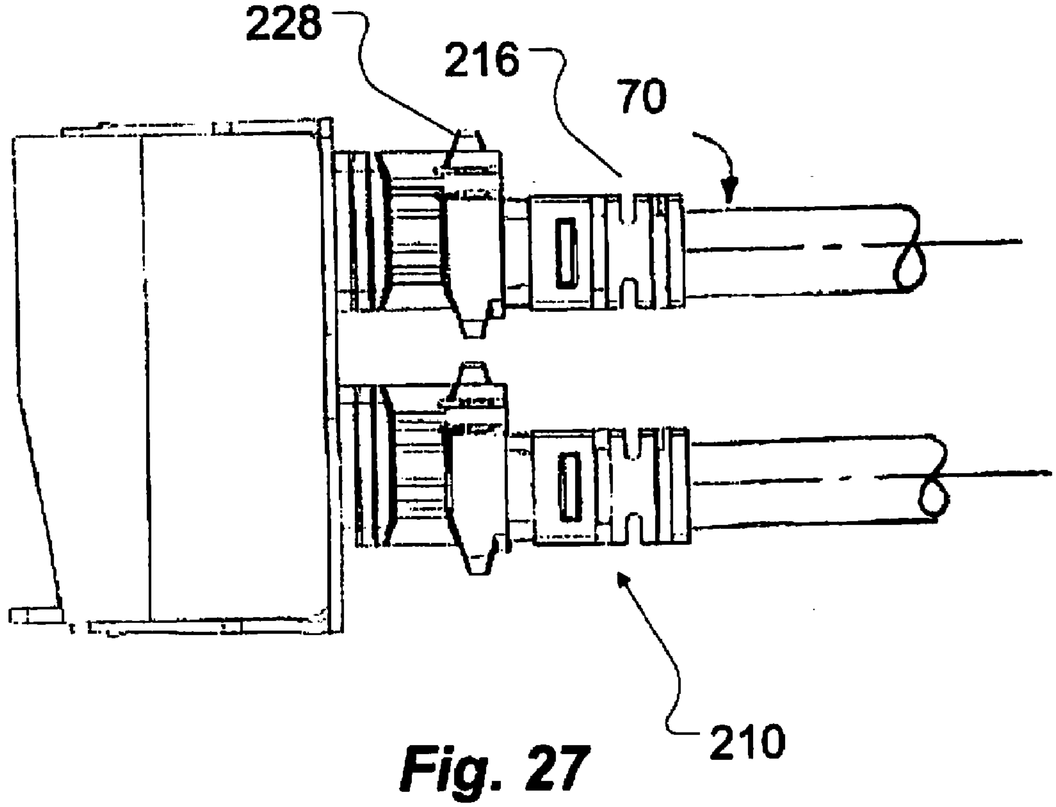
FIG. 27 is a side view of the plug of FIG. 20 installed in a patch panel with other plugs of the same design.
Figure 28:
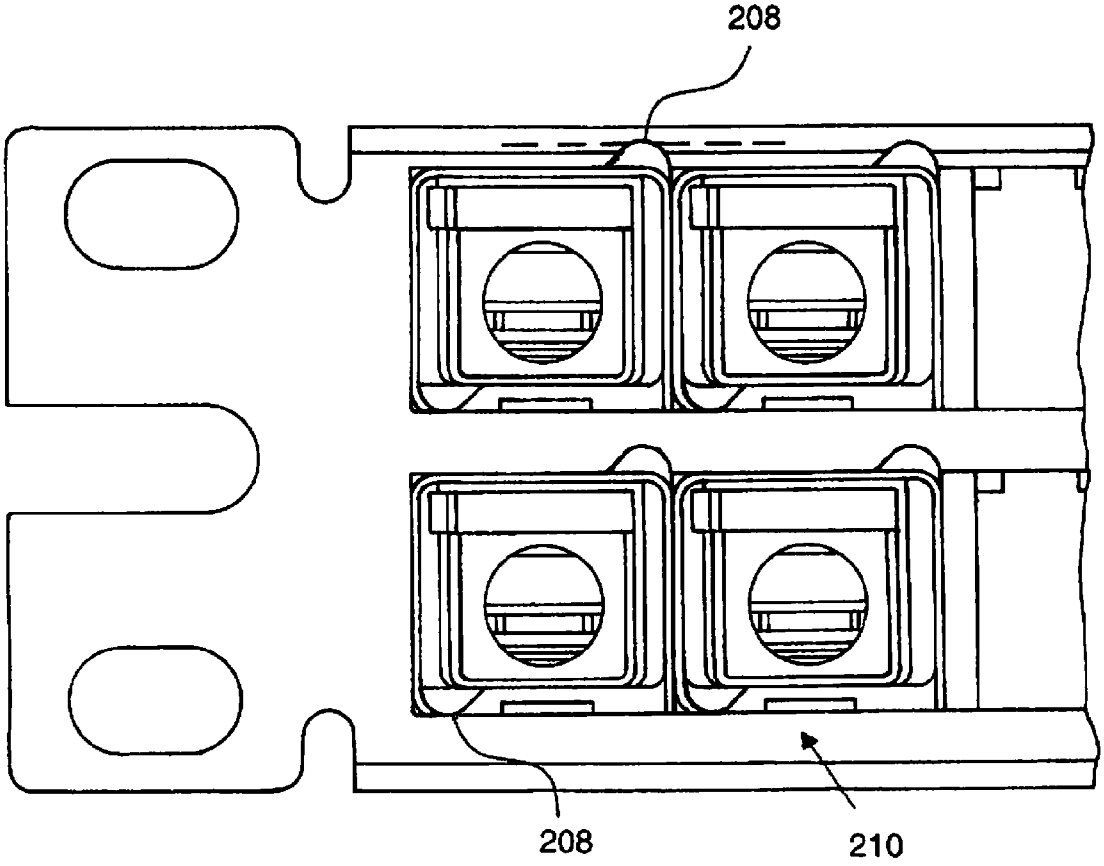
FIG. 28 is a front view of the plug of FIG. 27 installed in a patch panel with other plugs of the same design.

FIGS. 27 and 28 show a plug 210 installed in a patch panel. As shown in FIG. 27, cable 70 is attached to plug 210 at boot 216. FIG. 28 illustrates how the finger grips 228 are placed on the plugs 210 in an alternating manner to allow for easier manual insertion and removal of a single plug while neighboring plugs are inserted.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims. For example, though plugs according to the present invention have been illustrated as RJ-45 communication plugs, it is to be understood that the principles of the present invention could be applied to other types of plugs, including electrical and optical plugs.

We claim:

1. A tool for facilitating insertion and removal of a push-pull plug having a slidable outer housing, the tool comprising:
- a handle; and
- a stem extending from the handle, the stem including a clip at an end thereof, the clip having opposing clip arms at each end of the clip, each clip arm including a clip ridge, directed at the opposing clip arm, the clip arms being perpendicular to the stem;
- wherein the clip ridges are adapted to engage retention notches on the outer housing of the plug; and
- wherein the stem and clip are made of a flexible material.

2. A method of removing a push-pull plug from a jack using a tool, the plug comprising a latch arm and an outer housing having opposing retention notches, the outer housing being slidable to affect the operation of the latch arm, the tool comprising a handle and a stem extending from the handle, the stem including a clip at an end thereof, the clip having opposing clip arms at each end of the clip, each clip arm including a clip ridge, each clip ridge directed at the opposing clip arm, the method comprising:
- engaging the retention notches using the clip ridges;
- when the clip ridges are inserted into the retention notches, pulling the tool backwardly away from the jack to move the outer housing to a rearward position and thereby moving the latch arm to an unmated position; and
- after the latch arm is in the unmated position, further pulling the tool to remove the plug from the jack.

3. The method of claim 2 wherein engaging the retention notches using the clip ridges comprises:

engaging one of the retention notches with one of the clip ridges;

and axially rotating the tool to engage the opposing retention notch with the other clip ridge.

4. The method of claim 2 wherein engaging the retention notches using the clip ridges comprises engaging the retention notches from above the retention notches.

5. The method of claim 2 wherein engaging the retention notches using the clip ridges comprises engaging the retention notches from below the retention notches.

6. A method of inserting a push-pull plug into a jack using a tool, the plug comprising a latch arm and an outer housing having opposing retention notches, the tool comprising a handle and a stem extending from the handle, the stem including a clip at an end thereof, the clip having opposing clip arms at each end of the clip, each clip arm including a clip ridge, each clip ridge directed at the opposing clip arm, the method comprising:

engaging the retention notches using the clip ridges;

guiding the tool toward the jack and inserting the plug into the jack;

disengaging the clip ridges from the retention notches to disengage the tool from the plug by axially rotating the tool in one direction to disengage one clip ridge from the retention notch into which the one clip ridge has been inserted; and moving the tool slightly upward and axially rotating the tool in an opposite direction as the one direction to disengage the tool; and pulling the tool backwardly from the jack to remove the tool from the jack while the plug remains in the jack.

7. The method of claim 6 wherein engaging the retention notches using the clip ridges comprises engaging the retention notches from above the retention notches.

8. The method of claim 6 wherein engaging the retention notches using the clip ridges comprises engaging the retention notches from below the retention notches.

* * * * *

UNITED STATES PATENT AND TRADEMARK OFFICE

CERTIFICATE OF CORRECTION

PATENT NO. : 7,534,128 B2
APPLICATION NO. : 11/927025
DATED : May 19, 2009
INVENTOR(S) : Jack E. Caveney et al.

It is certified that error appears in the above-identified patent and that said Letters Patent is hereby corrected as shown below:

- Column 6, Line 45, "directed at the opposing clip arm," should read "each clip ridge directed at the opposing clip arm,".

Signed and Sealed this

Twenty-fourth Day of November, 2009

David J. Kappos

*Director of the United States Patent and Trademark Office*